United States Patent [19]

Kobayashi

[11] Patent Number: 5,233,005

[45] Date of Patent: Aug. 3, 1993

[54] METHOD FOR PREPARING ALPHA, OMEGA-DIHYDROXYPERFLUOROALK-YLETHYLMETHYLPOLYSILOXANES

[75] Inventor: Hideki Kobayashi, Chiba, Japan

[73] Assignee: Dow Corning Toray Silicone Co., Ltd., Tokyo, Japan

[21] Appl. No.: 937,269

[22] Filed: Aug. 31, 1992

[30] Foreign Application Priority Data

Sep. 30, 1991 [JP] Japan .................................. 3-278224

[51] Int. Cl.$^5$ .............................................. C08G 77/06
[52] U.S. Cl. .......................... 528/12; 528/23; 528/42; 556/488
[58] Field of Search ............................ 528/42, 12, 23; 556/488

[56] References Cited

U.S. PATENT DOCUMENTS

2,629,725  2/1953  Hyde ................................ 260/448.2

OTHER PUBLICATIONS

Journal of Organic Chemistry, (1960) vol 25, No. 2 pp. 310–311.

*Primary Examiner*—Melvyn I. Marquis
*Attorney, Agent, or Firm*—Robert Spector

[57] ABSTRACT

Alpha, omega-dihydroxyperfluoroalkylethylmethyl-polysiloxanes are prepared by reacting zinc oxide with a perfluoroalkylethylmethyldichlorosilane in an organic solvent, followed by the addition of water and protic acid with stirring to the resulting reaction mixture to generate the silanol group at the molecular chain terminals of the resultant polysiloxane. The advantage of the present method is the negligible yield of the corresponding cyclic polyorganosiloxanes.

3 Claims, No Drawings

METHOD FOR PREPARING ALPHA, OMEGA-DIHYDROXYPERFLUOROALKYLE-THYLMETHYLPOLYSILOXANES

BACKGROUND OF THE INVENTION

1. Field of the Invention

This invention relates to a method for preparing organopolysiloxanes. More particularly, this invention relates to a method for preparing alpha, omega-perfluoroalkylethylmethylpolysiloxanes where the perfluoroalkyl portion of the substituent contains more than one carbon atom.

2. Background Information

The preparation of halogen-terminated siloxanes by reaction of the corresponding halosilane $R_nSiX_{4-n}$ with zinc oxide is taught in U.S. Pat. No. 2,629,726, which issued to Hyde on Feb. 24, 1953. X represents halogen and the only halogenated hydrocarbon radicals represented by R are halogenated aryl, as exemplified by trifluorotolyl.

The preparation of hexaphenylcyclotrisiloxane, a cyclic trimer, by the reaction of diphenyldichlorosilane and zinc oxide in methyl acetate conducted at the boiling point the reaction mixture is described in the Journal of Organic Chemistry, Volume 25, Number 2, pp. 310–311 (1960).

It is known that the hydrolysis of a dialkyldichlorosilane produces a mixture of cyclic oligomeric dialkylsiloxanes and the corresponding linear dialkylpolysiloxane. The linear dialkylpolysiloxane can in many instances be recovered by distillation of the lower boiling cyclic oligomeric dialkylsiloxanes from the reaction mixture. However, in the case of perfluoroalkylethylmethylpolysiloxanes containing more than one carbon atom, the high boiling points of the corresponding cyclic oligomeric dialkylsiloxanes essentially preclude their separation by distillation.

One objective of the present invention is to provide a method for preparing alpha, omega-dihydroxyperfluoroalkylethylmethylpolysiloxanes that generates this product in high yields in the substantial absence of the corresponding cyclic oligomers.

SUMMARY OF THE INVENTION

The present inventors discovered that the foregoing objective can be achieved by reacting a perfluoroalkylethylmethyldichlorosilane with zinc oxide in an organic solvent followed by hydrolysis of the resultant reaction product with water in the presence of a protic acid.

DETAILED DESCRIPTION OF THE INVENTION

This invention provides a method for preparing an alpha, omega-dihydroxyperfluoroalkylethylmethylpolsiloxane, said method comprising
1) reacting zinc oxide and a perfluoroalkylethylmethyldichlorosilane of the formula

$$F(CF_2)_aC_2H_4SiMeCl_2$$

in an organic solvent, where Me represents methyl and a is an integer with a value of at least 2, for a sufficient time to convert the silane to the corresponding organopolysiloxane,
2) adding water and a protic acid with stirring to the resulting reaction mixture containing said organopolysiloxane to generate silanol groups at the molecular chain terminals, and
3) separating the resultant product, an alpha, omega dihydroxyperfluoroalkylethylmethylpolysiloxane from the water, organic solvents and the zinc chloride formed as a by product of the reaction.

To explain the present method in greater detail, the subscript a in the preceding formula for the perfluoroalkylethylmethyldichlorosilane reactant represents the number of perfluorinated carbon atoms present in the initial silane and the repeating units of the final organopolysiloxane. The value of a is at least 2 and is preferably 4, 6, or 8.

In accordance with the present method, the perfluoroalkylethylmethyldichlorosilane and zinc oxide are reacted in the presence of an organic solvent. This reaction yields the corresponding perfluoroalkylethylmethylpolysiloxane and generates zinc chloride as by-product. The reactants are generally heated, preferably at the boiling point of the organic solvent present in the reaction mixture.

The concentration of zinc oxide is generally equivalent to from 0.4 to 2 moles per mole of silane. At least 0.5 moles of the oxide per mole of oxide, equivalent to one equivalent weight of oxide per equivalent weight of silane, is preferred. No purpose is served by the use of more than 2 moles of oxide per mole of silane.

Organic solvents that can be used as the reaction medium for the first step of the present method include but are not limited to acetonitrile and the alkyl acetates can be used as the organic solvent in the present invention, and the alkyl acetates are exemplified by methyl acetate, ethyl acetate, isopropyl acetate, n-propyl acetate, isobutyl acetate, and so forth. These can be used in combination with auxiliary organic solvents that include but are not limited to ethers such as diethyl ether and tetrahydrofuran; ketones such as methyl isobutyl ketone; halohydrocarbons such as 1,1,1-trichloroethane, dichloroethane, alpha, alpha, alpha-trifluorotoluene, bis(trifluoromethyl)benzenes, 1,1,2-trichlorotrifluoroethane; and HCFC solvents such as $CHCl_2CF_3$ (HCFC123) and $CH_3CCl_2F$ (HCFC141b). Organic solvents that dissolve the alpha, omega-dihydroxyperfluoroalkylethylmethylpolysiloxane, the product of the present method, are particularly preferred. These preferred solvents include liquid halogenated hydrocarbons.

In the second step of the present method, the alpha, omega-dihydroxyperfluoroalkylethylmethylpolysiloxane is selectively produced by blending water and a protic acid into the reaction mixture produced during the first step of the method. This reaction replaces the terminal zinc chloride salt and/or chlorine atoms with silanol groups.

The products of the present method either do not contain cyclic perfluoroalkylethylmethylsiloxane oligomers or contain them only in insignificant quantities. The zinc chloride produced as a by-product is dissolved in the aqueous layer upon addition of the water and protic acid.

Any excess zinc oxide will remain suspended in the solvent mixture. It would be possible to remove this suspended excess zinc oxide by filtration and then separate the solid-free aqueous and organic layers. However, in the method according to the present invention, the admixture of water and protic acid to the reaction product causes dissolution of the suspended excess zinc oxide in the aqueous layer as zinc chloride with no loss of the desired alpha, omega-dihydroxyperfluoroalkylethylmethylpolysiloxane, which thus makes this use of the protic acid a highly advantageous feature. The protic acid used here is not specifically restricted as long as it can dissolve the zinc oxide. The protic acid is specifically exemplified by hydrochloric acid and sulfuric acid, and the use of hydrochloric acid is the more preferred.

The organic layer is washed several times with water, and the organic solvent is finally stripped off to yield the desired alpha, omega-dihydroxyperfluoroalkylethylmethylpolysiloxane.

The following examples described preferred embodiments of the present method and should not be interpreted as limiting the scope of the present invention as describes in the accompanying claims. Unless otherwise indicated, all parts and percentages in the examples are by weight, viscosities were measured at 25° C. and Me represents the methyl radical.

EXAMPLE 1

The following ingredients were placed in a flask and heated: 24.4 g (0.3 mol) zinc oxide, 70 g ethyl acetate, and 100 g meta-bis(trifluoromethyl)benzene. While heating under reflux, a mixture of 72.2 g (0.02 mol) perfluorobutylethylmethyldichlorosilane [F(CF$_2$)$_4$C$_2$H$_4$SiMeCl$_2$] and 40 g meta-bis(trifluoromethyl)benzene was added dropwise over one hour. Heating at the boiling point was continued for an additional 5 hours following completion of the addition. After cooling, 250 cc water was added with stirring. A 10 weight percent aqueous hydrochloric acid was added dropwise with stirring until the suspended solids had disappeared.

The reaction mixture was then transferred to a separatory funnel, and it separated into a transparent organic layer and an aqueous layer. The aqueous layer was discarded, and the organic layer was washed with water. The organic solvent was then distilled off by heating under reduced pressure. The resulting reaction product came to 95 weight % of the theoretical.

This recation product was analyzed by gel permeation chromatography (GPC) using monodisperse polydimethylsiloxane as standard. It was found that this reaction product was 99 weight % polysiloxane with average molecular weights of M$_w$=7,700 and M$_n$=5,240 and dispersivity=1.46 and that 1 weight % of the reaction product was a cyclic oligomeric siloxane with average molecular weights of M$_w$=1,200 and M$_n$=1,180 and dispersivity=1.08.

The reaction product was analyzed using to $^{29}$Si NMR measurement with tetramethylsilane as standard. The peak corresponding to the perfluorobutylethylmethylsiloxane cyclic trimer at −9.2 ppm was confirmed to account for 1 weight percent of the product, the presence of hydroxyperfluorobutylethylmethylsiloxane terminal units was confirmed by a peak at −14.3 ppm, and the repeating perfluorobutylethylmethylsiloxane unit was confirmed by a peak at −22.0 ppm. The peak at −19.8 ppm, corresponding to the cyclic tetramer typically present when cyclic oligomeric siloxanes are produced, was not detected in the present case. These analytical results confirmed that the preparative method described in this example exclusively produced a hydroxyl-terminated perfluorobutylethylmethylpolysiloxane with the formula

HO—{F(CF$_2$)$_4$C$_2$H$_4$SiMeO}$_b$—H

EXAMPLE 2

The following ingredients were placed in a flask and heated to the boiling point: 24.4 g (0.3 mol) zinc oxide and 150 g methyl acetate. A mixture of 72.2 g (0.2 mol) perfluorobutylethylmethyldichlorosilane [F(CF$_2$)$_4$C$_2$H$_4$SiMeCl$_2$] and 100 g isopropyl acetate was then added dropwise over a 2 hour period. Heating at the boiling point was continued for an additional 30 minutes following completion of the addition. After cooling, 250 cc water and 50 cc 1,1,2-trichlorotrifluoroethane were added to the reaction mixture with stirring. A 10 weight percent aqueous solution of hydrochloric acid was added dropwise with stirring until the suspended solids disappeared. The reaction mixture was then transferred to a separatory funnel, and it separated into a transparent organic layer and an aqueous layer. The aqueous layer was discarded, and the organic layer was washed several times with water. The organic solvent was then distilled off by heating under reduced pressure. The resulting reaction product weighed 64.1 g.

The following results were obtained when this reaction product was analyzed by gel permeation chromatography (GPC): average molecular weights of M$_w$=3,630 and M$_n$=1,250 and dispersivity=1.15. Analysis of the reaction product by $^{29}$Si NMR yielded the following results: the peaks for the cyclic trimer at −9.2 ppm and the cyclic tetramer at −19.8 ppm were not observed, and only the peaks corresponding to the terminal hydroxyperfluorobutylethylmethyl-siloxane unit at −14.3 ppm and the repeating perfluorobutylethyl-methylsiloxane unit at −22.0 ppm were observed. These analytical results confirmed that the preceding preparative method led to the exclusive production of a hydroxyl-terminated perfluorobutylethylmethylpolysiloxane with the following formula.

HO—{F(CF$_2$)$_4$C$_2$H$_4$SiMeO}$_b$—H

EXAMPLE 3

The following ingredients were placed in a flask and heated to the boiling point: 24.4 g (0.3 mol) zinc oxide, 70 g isopropyl acetate, and 100 g meta-bis(trifluoromethyl)benzene. While heating at the boiling point, a mixture of 122.2 g (0.2 mol) [F(CF$_2$)$_8$C$_2$H$_4$SiMeCl$_2$] and 40 g meta-xylene hexafluoride was added dropwise over 1 hour, and heating was continued for an additional 2 hours following completion of the addition. After cooling, 250 cc water was added with stirring. A 10 weight aqueous hydrochloric acid was added dropwise with stirring until the suspended solids disappeared. The reaction mixture was then transferred to a separatory funnel, and it separated into a transparent organic layer and an aqueous layer. The aqueous layer was discarded, and the organic layer was washed with water. The isopropyl acetate was then distilled off by heating under reduced pressure. The residual alpha, omega-dihydroxyperfluorooctylethylmethylpolysiloxane weighed 100.8 g. The following results were obtained from analysis by gel permeation chromatography (GPC), average molecular weights of M$_w$=6,150 and M$_n$=5,220 and dispersivity=1.18, the presence of 3 weight % cyclic oligomeric siloxane with average molecular weights of M$_w$=1,700 and M$_n$=1,600 and dispersivity=1.06.

That which is claimed is:

1. A method for preparing an alpha, omegadihydroxyperfluoroalkylethylmethylpolysiloxane, said method comprising
   1) reacting zinc oxide with a perfluoroalkylethylmethyldichlorosilane of the formula $F(CF_2)_aC_2H_4SiMeCl_2$ in an organic solvent, where Me represents methyl and a is an integer with a value of at least 2, for a sufficient time to convert the silane to the corresponding organopolysiloxane,
   2) adding water and a protic acid with stirring to the resulting reaction mixture containing said organopolysiloxane to generate silanol groups at the molecular chain terminals, and
   3) isolating the resultant product, an alpha, omegadihydroxyperfluoroalkylethylmethylpolysiloxane from the organic solvent, water and the zinc chloride formed as a by-product of the reaction.

2. A method according to claim 1 where the mixture of said silane, zinc oxide and organic solvent are heated; the value of a is 4, 6, or 8; the molar ratio of zinc oxide to said silane is from 0.4 to 2, said organic solvent is selected from the group consisting of acetonitrile and alkyl acetates, said protic acid is hydrochloric or sulfuric acid and the said organic solvent includes an auxiliary organic solvent.

3. A method according to claim 2 where said solvent is ethyl acetate, said auxiliary solvent is metabis(trifluoromethyl)benzene; said mixture is heated at the boiling point; a is 4, or 8; and the resultant product is isolated by evaporating the organic liquids from the non-aqueous phase of the reaction mixture.

* * * * *